United States Patent [19]
Schittenhelm

[11] 3,746,362
[45] July 17, 1973

[54] CHASSIS FRAME

[76] Inventor: Jean Albert Schittenhelm, P.O. Box No. 13, Trignac (44), France

[22] Filed: Aug. 2, 1971

[21] Appl. No.: 168,071

[52] U.S. Cl. .......................................... 280/106 T
[51] Int. Cl. .......................................... B62d 21/00
[58] Field of Search .................. 280/106 R, 106 T

[56] References Cited
UNITED STATES PATENTS
3,534,977  10/1970  Wessel .................. 280/106 R
3,282,603  11/1966  Barth .................... 280/106 T FOREIGN PATENTS OR APPLICATIONS
768,379  2/1957  Great Britain ............ 280/106 T
145,474  2/1951  Sweden .................. 280/106 T Primary Examiner—Philip Goodman
Attorney—Brody and Neimark

[57] ABSTRACT

A light-weight frame or chassis for supporting vehicle-towed trailers. The frame is generally "A"-shaped having two long principal sides beams connected at one end and several transverse braces connecting the side beams. The frame is attached to an automobile at its apex.

10 Claims, 7 Drawing Figures

FIG. 1.
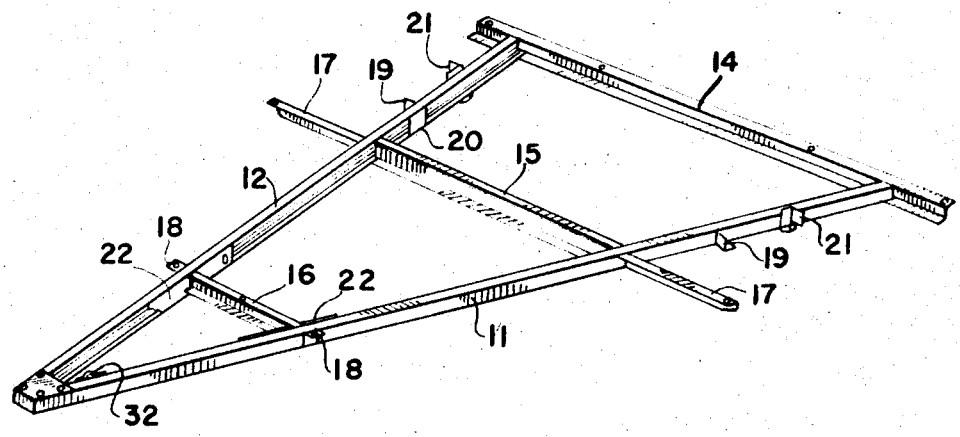
FIG. 2.
FIG. 3.
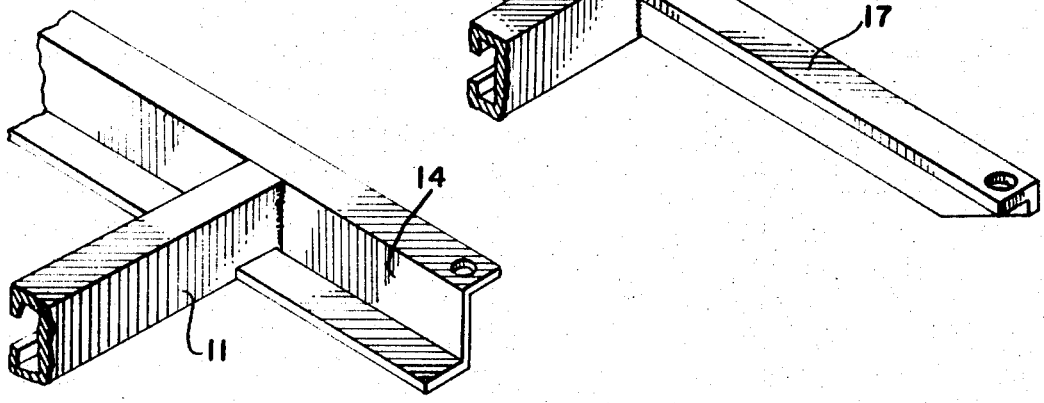
FIG. 4.
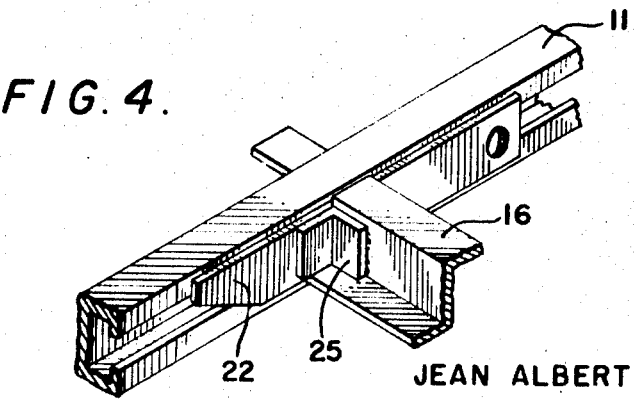
INVENTOR
JEAN ALBERT SCHITTENHELM
BY Browdy and Neimark
ATTORNEYS

INVENTOR
JEAN ALBERT SCHITTENHELM

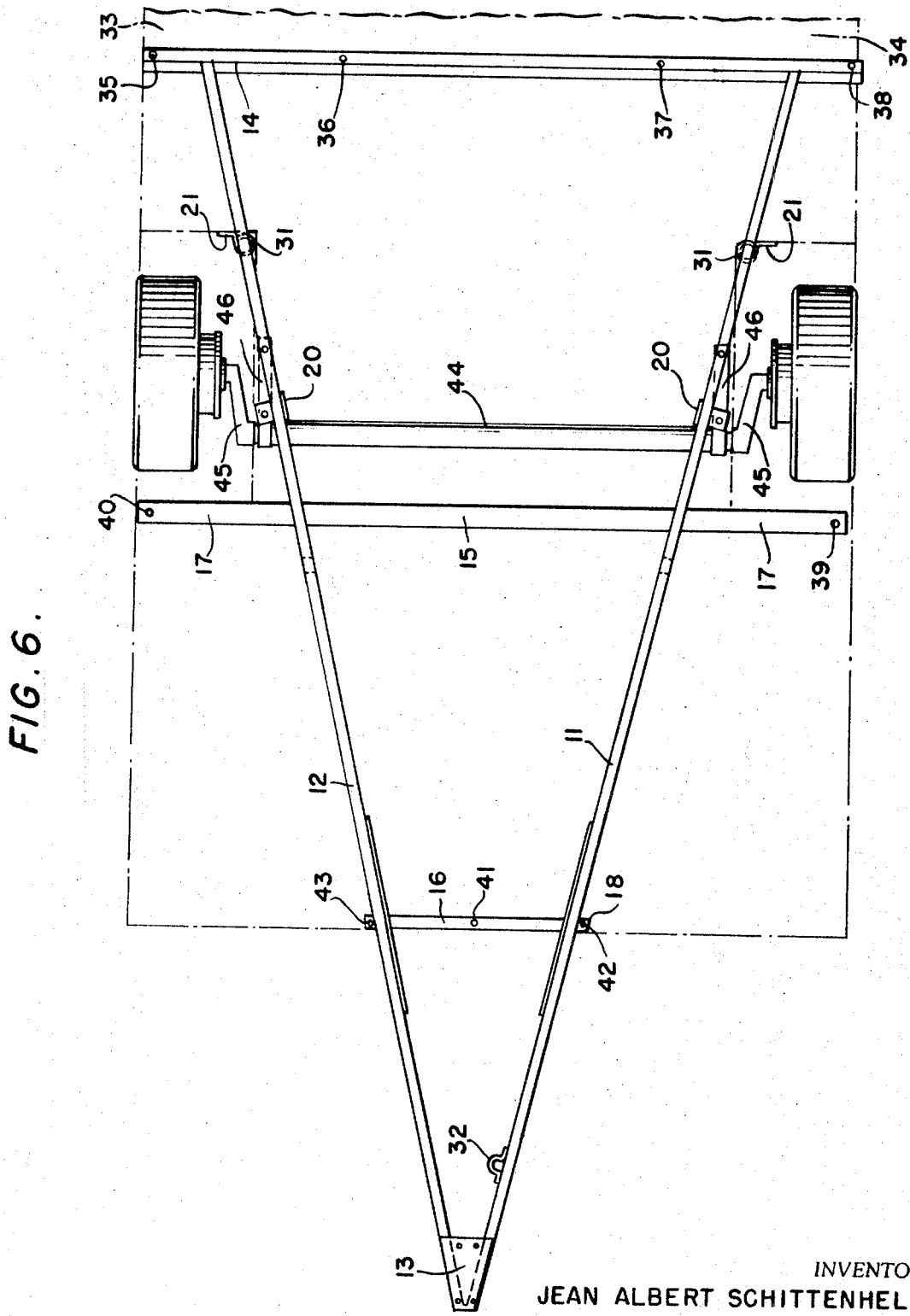

CHASSIS FRAME

The present invention relates to a frame for supporting a medium-sized trailer.

The manufacture of medium-sized camping trailers to be towed by an automobile or the like is a rapidly growing industry. There is, accordingly, an increasing necessity for small, light-weight, strong, inexpensive frames or structural chasses for these trailers.

Until now, frames built for supporting small house trailers or medium size camping trailers have been constructed of several heavy metal bars joined in a square or rectangle of the general shape of the trailer. This rectangular frame is then joined, either by welding, scarf-jointing or some other procedure, to a generally "V"-shaped structure in the front, in order to be attached to a coupling ball on the towing vehicle. Consequently, the strains due to the towing, concentrate on this joint. Many large individual pieces have to be assembled during the manufacture of these prior art frames. Often they are asymetrical about the towing axis, thus causing the finished assembly not to be absolutely flat.

In addition, such essentially rectangular frames are expensive to manufacture and suffer the additional disadvantage of not providing the strongest structural configuration possible.

The frame of the present invention overcomes the problem of the prior art. It is strong, light-weight and rigid. With few changes it can be manufactured in various sizes to accommodate different sizes of trailers. Straight rectilinear beams are used in its construction and thus the manufacture and stocking of the pieces is facilitated. Although it is simple and light-weight, the floor of the trailer is adequately supported at a number of well distributed supports. Furthermore, no structure appears above the floorboard of the trailer. The cross-sectional shape of the component beams is chosen so that the frame is strong and dimensionally stable and yet light-weight. It is perfectly symetrical about its pulling axis facilitating the manufacture of perfectly flat assemblies. It is constructed in such a way that the strains caused by the carrying axle are transmitted by its principal beams directly to the coupling device, thus avoiding the generation of asecondary moments.

It is, accordingly, an object of the invention to overcome the defects of the prior art, as indicated above.

It is another object to provide an improved trailer chassis, of great strength, dimensional stability and yet of low cost.

These and other objects of the invention will be more apparent from the following description of an embodiment of the invention:

Essentially, the present invention consists of an A-shaped frame principally constituted of two straight side beams of a closed "C" cross-section joined at the apex. A number of transverse braces connect the sides of the A-frame. The axle and trailer floorboard are supported directly on the frame, and it is connected to the towing vehicle at its apex.

The invention will be better understood if reference is had to the drawings in which FIG. 1 is a perspective view of the frame according to the present invention.

FIGS. 2, 3 and 4 are fragmentary detailed perspective views showing details of the frame of FIG. 1.

FIG. 6 is a plan view of the frame and trailer of FIG. 5.

Figure 5:
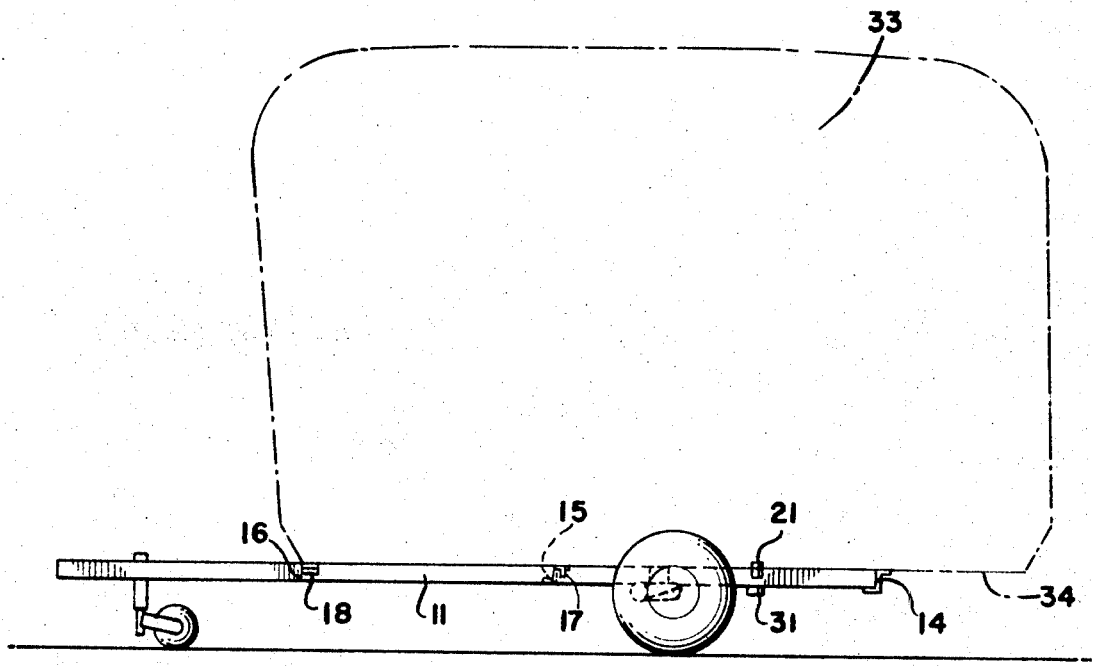
FIG. 5 is a side elevational view of the frame of the present invention with the trailer, jockey wheel and axle mounted thereon.

Referring to FIG. 1, the triangular frame is composed of principal side beams 11 and 12 constituting the sides of the "A"-frame. Beams 11 and 12 are joined at an angle by a nose bracket 13. A rear traverse beam 14 which has a "Z"-shaped cross-section is attached, preferably by welding, onto the end of beams 11 and 12 as can be seen more clearly in FIG. 2. A median traverse beam 15 which is also "Z"-shaped is welded to the side beams 11 and 12 in the middle section of the "A"-frame by means of corner element 24 (FIG. 3). A frontal "Z"-shaped traverse beam 16 is attached between the side beams 11 and 12 near the front of the A-frame.

Two lateral traverse beams 17 are joined to the exterior sides of the side beams 11 and 12 approximately opposite median traverse beam 15. These lateral traverse beams 17 are joined to side beams 11 and 12 by corner-elements 23, seen more clearly in FIG. 3.

On the exterior of side beams 11 and 12, opposite front traverse beams 16 are two floor board fixation brackets 18 serving as fixation points for fastening the trailer floor board to the A-frame. Two axle fixation elements 19 are attached on the exterior of each side beam 11 and 12 a little behind median traverse beam 15. These elements serve as fixation points for the carrier axle bracket. The carrier axle bracket is attached to both side beams 11 and 12 and axle fixation elements 19.

On the internal side of each side beam 11 and 12 and opposite each of the axle fixation elements, a reinforcing element 20 is attached. This reinforcement 20 serves to absorb the localized strain on side beam 11 and 12 caused by the axle. Bending or twisting of the side beams 11 and 12 due to the strains on axle fixation elements 19 is thus prevented.

Two corner abutments 21 are attached to the exterior of the side beams 11 and 12 at a position approximately midway between the rear traverse beam 14 and median traverse beam 15. These abutments 21 extend up above the plane of the A-frame and engage the trailer floor board at the corner of the wheel well. In this manner, the trailer itself is assured of being placed in its correct longitudinal setting.

At the internal front of each side beam 11 and 12 and arranged on either side of front traverse 16 are two frontal reinforcements 22, most clearly seen in FIG. 4. Frontal traverse beam 16 is attached to these reinforcements 22 by corner bracket 25.

Two attachments 31 may be added to the bottom of beams 11 and 12 to assist in the attachment of a lifting jack. A bracket 32 may conveniently be attached to one of the side beams 11 and 12 for clamping the shaft of a jockey wheel to the A-frame.

Referring to FIGS. 5 and 6, the assembled frame having trailer 33 and carrier axle 44 mounted thereon can be seen. The floorboard 34 of the trailer 33 is fastened to rear traverse beam 14 at 35, 36, 37 and 38, lateral traverse beams 17 at 39 and 40, frontal traverse beam 16 at 41 and floorboard fixation brackets 18 at locations 42 and 43. Carrier axle 44 is mounted via suitable torsion bars 45 to carrier axle mounting brackets 46.

Mounting brackets 46 are themselves mounted on side beams 11 and 12 and axle fixation elements 19. Jockey wheel 47 is attached to side beam 12 by bracket 32. Corner abutments 21 assure that the wheel well of floorboard 34 is in proper alignment.

From this description it should be clear that through the use of unbent side beams a light-weight, strong, rigid frame can be manufactured which embodies, contrary to prior constructions, the inherent strength and stability of the triangular configuration. Another advantage of this construction is the fact that the principle of construction can easily be extrapolated to make the chassis even longer and suitable for heavier and longer trailers.

Figure 7:
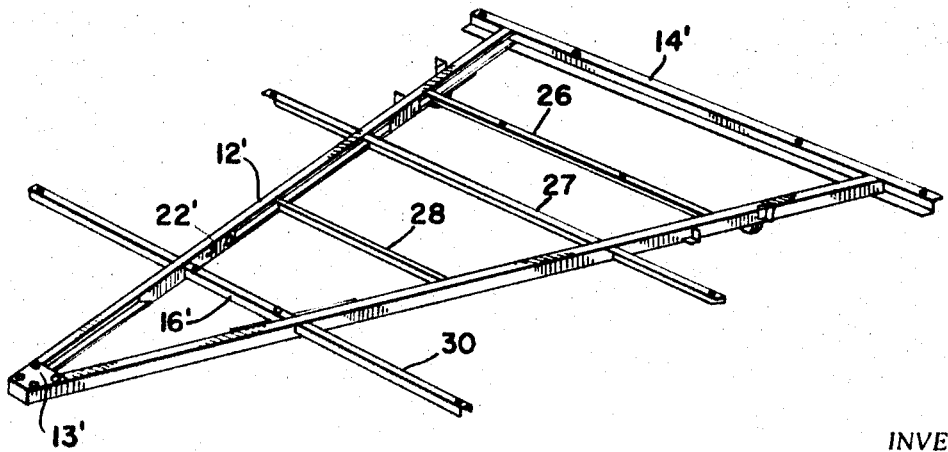
FIG. 7 is a perspective view of another embodiment of the frame according to the present invention.

Thus, FIG. 7 is a view of an embodiment suitable for heavier and longer trailers. Longer side beams 11' and 12' are joined by nose bracket 13'. Rear traverse beam 10' is joined to the rear end of side beams 11' and 12'. Frontal traverse beam 16' is joined by reinforcement 22' to the front of the side beams 11' and 12'. However, instead of one median traverse beam there are three, 26, 27 and 28. These are required to give adequate bracing to the longer frame. Lateral traverse beams 29 are joined to the sides of the side beams 11' and 12' opposite the median traverse 27 which is closest to the mid-point between rear traverse beam 14' and frontal traverse beam 16'. Further lateral support beams 30 are provided on the exterior of side beams 11' and 12' opposite the frontal traverse beam 16' in order to give additional support to the front of the trailer.

The type of rectilinear beam utilized makes the manufacture of identical pieces from the same tool stock possible, as well as easy stocking at the manufacturing level. The stocking needs little room and it is possible to deliver in pre-cut sections. These are factors of definite industrial economy.

The geometry of the A-frame chassis permist joining the chassis to the trailer floor on a number of well distributed supports. Furthermore, the fact that on the exterior of the trailer no structure appears above the floorboard is a very favorable element for the customer from the point of view of looks.

The choice of sections in a closed "C" cross-sectional shape is very important and is due to a concern to avoid any bending or twisting due to the strains caused by the coupling of the trailer to the hauling vehicle. In fact, small beams in an open "C" cross-section would permit a bending of the principal web of the "C" due to the strains.

It is very important to note that the coupling shaft on prior art trailer frames is a separate element. In the present invention it is constituted by an extension of the principal beams themselves. There is no interruption by welding or scarf-jointing, for example. Thus, the strains due to the coupling disappear more easily and smaller beams can be used.

The simplicity of the conception of the A-frame and its symmetry with respect to the pulling axis makes it possible to get perfectly flat assemblies during manufacture, as opposed to the case where a chassis is constituted of several elements asymetrically arranged in relation to this axis.

The strains caused by the carrying axle are felt directly on the principal beams. The strains are translated directly up the beams to the coupling device and thus no secondary moments are generated.

For small trailer models (up to 18 feet) it is unnecessary for the chassis to extend all the way to the rear of the trailer. A small overhang is permissible due to the rigidity of the trailer itself.

Although the present invention has been described with a certain degree of particularity, it is to be understood that the invention is not to be limited to the details set forth but that modifications and adaptations may be made without departing from the invention.

What is claimed is:

1. A frame for carrying vehicle-towed trailers comprising:

two principal metal beams of a closed "C" cross-section joined to one another at one end and apart at the other end;

a rear traverse beam joining said principal beams at the open end thereof;

at least one median traverse beam attached to the interiors of said principal beams and extending therebetween at a position between the ends of said principal beams;

a frontal traverse beam attached to the interiors of said principal beams and extending therebetween at a position between said median traverse beam and said joined end of said principal beams; and a lateral traverse beam attached to the exterior of each of said principal beams at a position opposite one of said median traverse beams, whereby the frame may be coupled to the towing vehicle at the apex of the frame and wherein said traverse beams do not extend above the upper surface of said principal beams.

2. A frame in accordance with claim 1 wherein:

said principal beams are positioned such that the solid side of said "C" cross-section is facing externally.

3. A frame in accordance with claim 2 wherein:

said rear traverse beam, said median traverse beams and said frontal traverse beam are of a "Z"-shaped cross-section.

4. A frame in accordance with claim 3, further including:

a floor board fixation bracket attached to the exterior of each of said principal beams opposite said frontal traverse beam.

5. A frame in accordance with claim 4 further including:

an axle fixation element attached to the exterior of each of said principal beams.

6. A frame in accordance with claim 5, further including:

an axle reinforcement element attached to the interior of each of said principal beams at a position opposite said axle fixation elements.

7. A frame in accordance with claim 6, further including:

a corner abutment attached to each of said principal beams and extending above the plane of said beams for positioning the trailer on the frame.

8. A frame in accordance with claim 7, further including:

a frontal reinforcement element positioned on the internal side of each of said principal beams between said frontal traverse and said principal beams.

9. A frame in accordance with claim 8, further including:

a second lateral traverse beam attached to the exterior of each of said principal beams at a position opposite said frontal traverse beam.

10. A frame for carrying vehicle-towed trailers comprising:
   two principal metal beams joined to one another at one end and apart at the other end, said principal beams having a closed "C" cross-section and being positioned such that the soled side of said "C" cross-section is facing externally;
   a rear traverse beam joining said principal beams at the open end thereof;
   at least one median traverse beam connected to said principal beams at a position between the ends of said principal beams;
   a frontal traverse beam attached to said principal beams at a position between said median traverse beam and said joined end of said principal beams wherein said rear traverse beam, said median traverse beam and said frontal traverse beam are of a "Z" shaped cross-section;
   a lateral traverse beam attached to the exterior of each of said principal beams at a position opposite one of said median traverse beams;
   a floor board fixation bracket attached to the exterior of each of said principal beams opposite said frontal traverse beam;
   an axle fixation element attached to the exterior of each of said principal beams; and
   an axle reinforcement element attached to the interior of each of said principal beams at a position opposite said axle fixation elements.

* * * * *